United States Patent
Ostrand et al.

(10) Patent No.: US 11,816,311 B2
(45) Date of Patent: Nov. 14, 2023

(54) AUTOMATICALLY DETECTING NEED FOR BREAKOUT VIRTUAL MEETING

(71) Applicant: INTERNATIONAL BUSINESS MACHINES CORPORATION, Armonk, NY (US)

(72) Inventors: Rachel Ostrand, Milford, PA (US); James Philip O'Connor, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/206,445

(22) Filed: Mar. 19, 2021

(65) Prior Publication Data

US 2022/0303321 A1 Sep. 22, 2022

(51) Int. Cl.
*G06F 3/0484* (2022.01)
*H04L 65/401* (2022.01)
(Continued)

(52) U.S. Cl.
CPC ........ *G06F 3/0484* (2013.01); *H04L 65/1093* (2013.01); *H04L 65/403* (2013.01);
(Continued)

(58) Field of Classification Search
CPC . H04L 65/403; H04L 65/1093; H04L 65/306; H04L 65/4015; H04L 65/1006; H04L 12/1822; H04L 67/535; H04L 67/306; H04L 67/52; H04L 65/1104; H04M 3/565; H04M 3/568; H04M 3/564;
(Continued)

(56) References Cited

U.S. PATENT DOCUMENTS 8,706,539 B1   4/2014  Mohler
8,917,847 B2   12/2014 Mai
(Continued)

FOREIGN PATENT DOCUMENTS

CN   101471806 A   7/2009
KR   101059681 B1  8/2011

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Kyung H Shin
(74) *Attorney, Agent, or Firm* — Rakesh Roy (57) ABSTRACT

A method, computer system, and a computer program product for automatic detection of the need for a breakout virtual meeting is provided. The present invention may include receiving a computerized version of a real-time conversation between a plurality of participants of a virtual meeting. The present invention may also include determining whether a breakout virtual meeting is necessary among a subset of the plurality of participants of the virtual meeting. The present invention may further include, in response to determining that the breakout virtual meeting is necessary, automatically transmitting an alert indicating that the breakout virtual meeting is necessary among the subset of the plurality of participants of the virtual meeting.

17 Claims, 6 Drawing Sheets (51) Int. Cl.
*H04L 65/1093* (2022.01)
*H04M 3/56* (2006.01)
*H04L 67/50* (2022.01)
*H04L 65/403* (2022.01)

(52) U.S. Cl.
CPC ........ *H04L 65/4015* (2013.01); *H04L 67/535* (2022.05); *H04M 3/564* (2013.01); *H04M 3/566* (2013.01)

(58) Field of Classification Search
CPC ...... H04M 3/56; G06F 3/0482; G06F 3/0484; G06F 3/165; G06F 3/1454; G06F 3/167; G06F 3/1423; H04W 4/06
See application file for complete search history.

(56) References Cited

U.S. PATENT DOCUMENTS

| | | | |
|---|---|---|---|
| 8,938,677 B2 | 1/2015 | Geppert | |
| 9,420,108 B1 * | 8/2016 | Bostick | H04L 67/535 |
| 2007/0300165 A1 * | 12/2007 | Haveliwala | G06F 3/0482 |
| | | | 715/810 |
| 2012/0128146 A1 | 5/2012 | Boss | |
| 2014/0267550 A1 | 9/2014 | Nimri | |
| 2015/0304607 A1 | 10/2015 | Bader-Natal | |
| 2017/0351476 A1 * | 12/2017 | Yoakum | G06F 3/0484 |
| 2018/0048683 A1 * | 2/2018 | Katekar | H04L 65/403 |
| 2018/0097858 A1 | 4/2018 | Gilzean | |

OTHER PUBLICATIONS

Zoom, "Enabling breakout rooms," [accessed Dec. 18, 2020], Retrieved from the Internet: ,https://support.zoom.us/hc/en-us/articles/206476093-Enabling-breakout-rooms>, 3 pages.

* cited by examiner

AUTOMATICALLY DETECTING NEED FOR BREAKOUT VIRTUAL MEETING

BACKGROUND

The present invention relates generally to the field of computing, and more particularly to virtual meetings.

Audio and/or video-based conference calls (e.g., virtual meetings) may include many participants. Therefore, in order to optimize resource usage, the topics discussed should be relevant to all of the participants. However, some situations may necessitate a small subset of the participants to have a side conversation which does not involve all of the participants. When a side conversation (with only a small number of necessary participants) occurs during a larger meeting with the full set of participants, the side conversation may waste the time of the unnecessary participants. In large meetings, the wasted time may add up to a substantial loss of person-hours and money. In addition, the side conversations may be particularly disruptive in virtual meetings because multiple participants talking at the same time may make it difficult to hear any of the participants.

SUMMARY

Embodiments of the present invention disclose a method, computer system, and a computer program product for automatic detection of the need for a breakout virtual meeting. The present invention may include receiving a computerized version of a real-time conversation between a plurality of participants of a virtual meeting. The present invention may also include determining whether a breakout virtual meeting is necessary among a subset of the plurality of participants of the virtual meeting. The present invention may further include, in response to determining that the breakout virtual meeting is necessary, automatically transmitting an alert indicating that the breakout virtual meeting is necessary among the subset of the plurality of participants of the virtual meeting.

According to one advantageous embodiment, the present invention may include generating a timestamped speaker log based on the received computerized version of the real-time conversation between the plurality of participants of the virtual meeting. The present invention may also include calculating, based on the generated timestamped speaking log, a number of unique speakers talking over a set period of time. The present invention may also include comparing the calculated number of unique speakers against a minimum participation parameter to determine whether the breakout virtual meeting is necessary.

According to another advantageous embodiment, the present invention may include receiving a time duration parameter. In one embodiment, the received time duration parameter may be associated with a maximum duration of a sub-discussion in the virtual meeting. The present invention may also include receiving a minimum participation parameter. In one embodiment, the received minimum participation parameter may be associated with a minimum number of the plurality of participants that need to speak for the virtual meeting to be considered a full-group discussion. The present invention may further include detecting the sub-discussion in the virtual meeting extending beyond a set period of time determined by the received time duration parameter. The present invention may also include determining that the subset of the plurality of participants speaking during the detected sub-discussion is less than the received minimum participation parameter. The present invention may further include automatically transmitting the alert to the subset of the plurality of participants including a link to the breakout virtual meeting. In one embodiment, the breakout virtual meeting may be established in a breakout virtual meeting room that is audio and video insulated from the virtual meeting.

According to another advantageous embodiment, the present invention may include receiving a breakout action parameter indicating the breakout virtual meeting is automatically created responsive to a breakout condition being met. In such embodiments, in response to determining that the breakout virtual meeting is necessary, the present invention may include automatically creating the breakout virtual meeting for the subset of the plurality of participants of the virtual meeting.

According to another advantageous embodiment, the present invention may include receiving a breakout action parameter indicating the breakout virtual meeting is automatically suggested responsive to a breakout condition being met. In such embodiments, in response to determining that the breakout virtual meeting is necessary, the present invention may include automatically suggesting the breakout virtual meeting for the subset of the plurality of participants of the virtual meeting.

According to another advantageous embodiment, the present invention may include receiving a breakout decision parameter. In one embodiment, the received breakout decision parameter may be associated with identifying at least one decision maker responsible for determining whether the subset of the plurality of participants is sent to the breakout virtual meeting. In at least one embodiment, the received breakout decision parameter may be selected from a group consisting of: a host of the virtual meeting, the subset of the plurality of participants, and a majority vote by the plurality of participants.

According to another advantageous embodiment, the present invention may include receiving at least one configurable parameter. In one embodiment, the received at least one configurable parameter is selected from the group consisting of: a time duration parameter, a minimum participation parameter, an alert mechanism parameter, a breakout action parameter, and a breakout decision parameter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatic breakout virtual meeting detection. As such, the present embodiment has the capacity to improve the technical field of virtual meetings by automatically detecting the need for a breakout virtual meeting. More specifically, a virtual meeting program may receive, using a computing device, a computerized version of a real-time conversation among a plurality of participants. Then, the virtual meeting program may determine, using the computing device, whether a breakout virtual conversation is necessary among a breakout group including less than a majority of the plurality of participants of the real-time conversation. Thereafter, the virtual meeting program may send, using the computing device, an automated invitation to the breakout group if it is determined that the breakout virtual conversation is necessary.

As described previously, audio and/or video-based conference calls (e.g., virtual meetings) may include many participants. Therefore, in order to optimize resource usage, the topics discussed should be relevant to all of the participants. However, some situations may necessitate a small subset of the participants to have a side conversation which does not involve all of the participants. When a side conversation (with only a small number of necessary participants) occurs during a larger meeting with the full set of participants, the side conversation may waste the time of the unnecessary participants. In large meetings, the wasted time may add up to a substantial loss of person-hours and money. In addition, the side conversations may be particularly disruptive in virtual meetings because multiple participants talking at the same time may make it difficult to hear any of the participants.

Therefore, it may be advantageous to, among other things, provide a way to automatically detect the need to create a breakout meeting within a larger virtual or call-in meeting. This may be advantageous to facilitate valuable conversation among only the relevant subset of the meeting participants. Existing technologies do not provide the advantages of automatically detecting the need for a breakout virtual meeting. One major advantage of the present disclosure is that embodiments may enable the meeting participants to realize that a breakout meeting may be necessary which the meeting participants may not have thought to initiate on their own.

According to at least one embodiment, a virtual meeting program of the present disclosure may automatically detect a need to create a breakout meeting based on a series of configurable parameters, such as, for example, the number and duration of participants who are actively speaking. In at least one embodiment, the breakout meeting in a breakout or sidebar meeting room and the original meeting in a primary meeting room may be audio and video insulated from each other. In one embodiment, participants may dynamically move from the primary meeting room to the breakout room and vice versa. In various embodiments, when the breakout meeting is completed, the breakout meeting room may be closed, moving all participants back to the primary meeting room.

According to one embodiment, the virtual meeting program may enable several configurable parameters. In one embodiment, a configurable parameter may include a toggle to enable or disable the automatic detection of the need to create a breakout meeting. For example, if the automatic detection is toggled off by a user, the virtual meeting program should not suggest a breakout or sidebar meeting during a presentation, as the intention is only for the presenter(s) to be speaking. In another embodiment, the configurable parameter may include a duration of sub-discussion (e.g., indicated by variable "T" in the present disclosure) parameter which may be associated with how much time has passed during which only a small number of participants have spoken in the meeting. In at least one embodiment, the configurable parameter may also include a minimum participants that need to be speaking to be considered a full-group discussion and not breakout-worthy (e.g., indicated by variable "M" in the present disclosure). In one embodiment, the minimum participants may be represented by a minimum number of participants (e.g., raw number) and/or a percentage of the total meeting participants.

According to one embodiment, the virtual meeting program may alert users to create a breakout room in one or more of the following manners. In one embodiment, the virtual meeting program may transmit a textual message using a messaging platform to the host and/or all participants. In one embodiment, the virtual meeting program may transmit (e.g., play) an audio message within the primary meeting room (e.g., "Please click this button to create a breakout room with users Rachel and James"). In one embodiment, the virtual meeting program may generate a visual message within the primary meeting room (e.g., Red button which instructs the users to click to create a breakout room with user Rachel and James).

According to one embodiment, the virtual meeting program may provide suggestions and information regarding how the main meeting time is progressing but may not force attendees into the breakout room. Thus, the meeting participants/hosts may decide how to respond to an alert from the virtual meeting program (e.g., whether it makes sense to form the breakout room now, set up a sub-meeting later, or continue the small discussion within the main meeting). In at least one embodiment, the virtual meeting room may automatically generate a breakout room.

Figure 1:
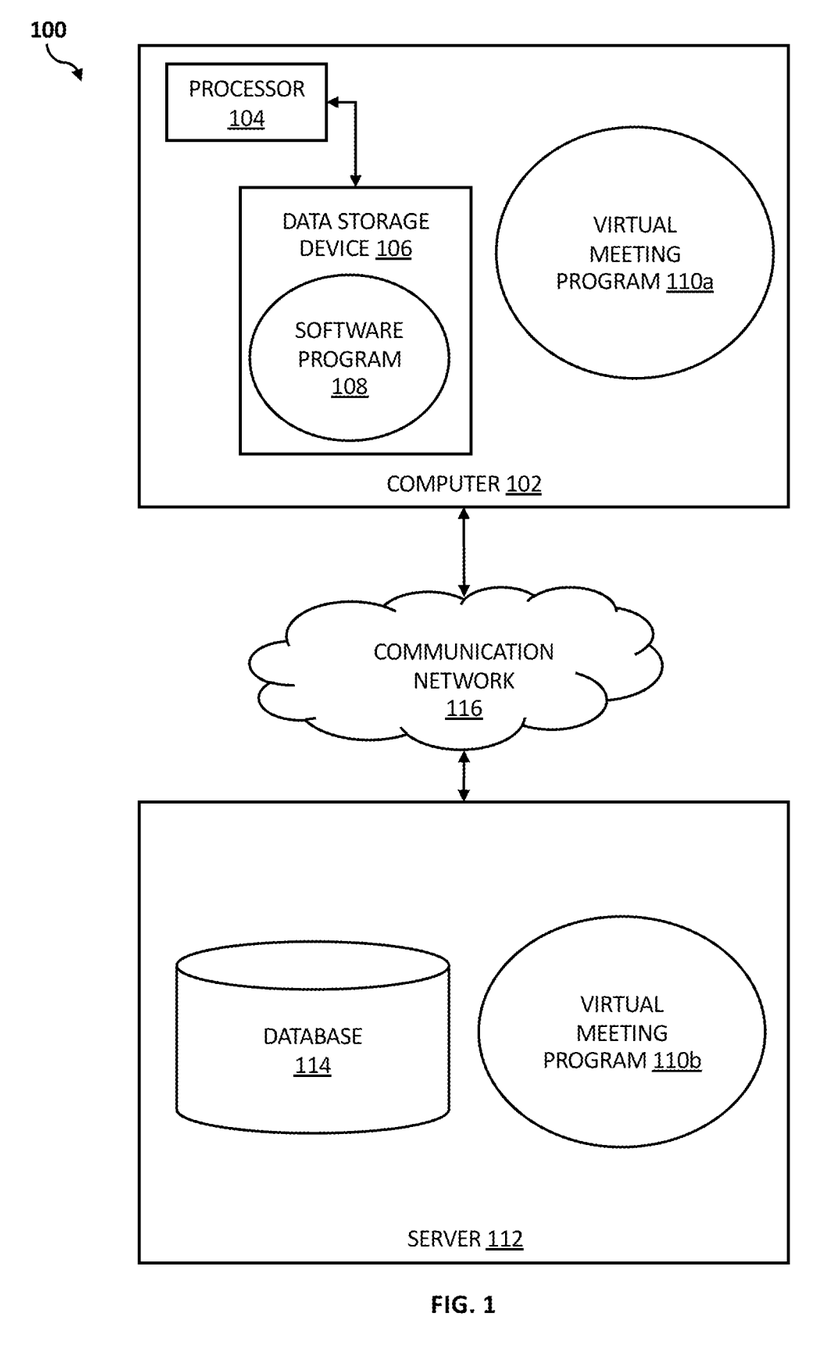
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a virtual meeting program 110a. The networked computer environment 100 may also include a server 112 that is enabled to run a virtual meeting program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the virtual meeting program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the virtual meeting program 110a, 110b (respectively) to automatically detect a need to create a breakout virtual meeting within a primary virtual meeting. Embodiments of the present disclosure are explained in more detail below with respect to FIGS. 2 and 3.

Figure 2:
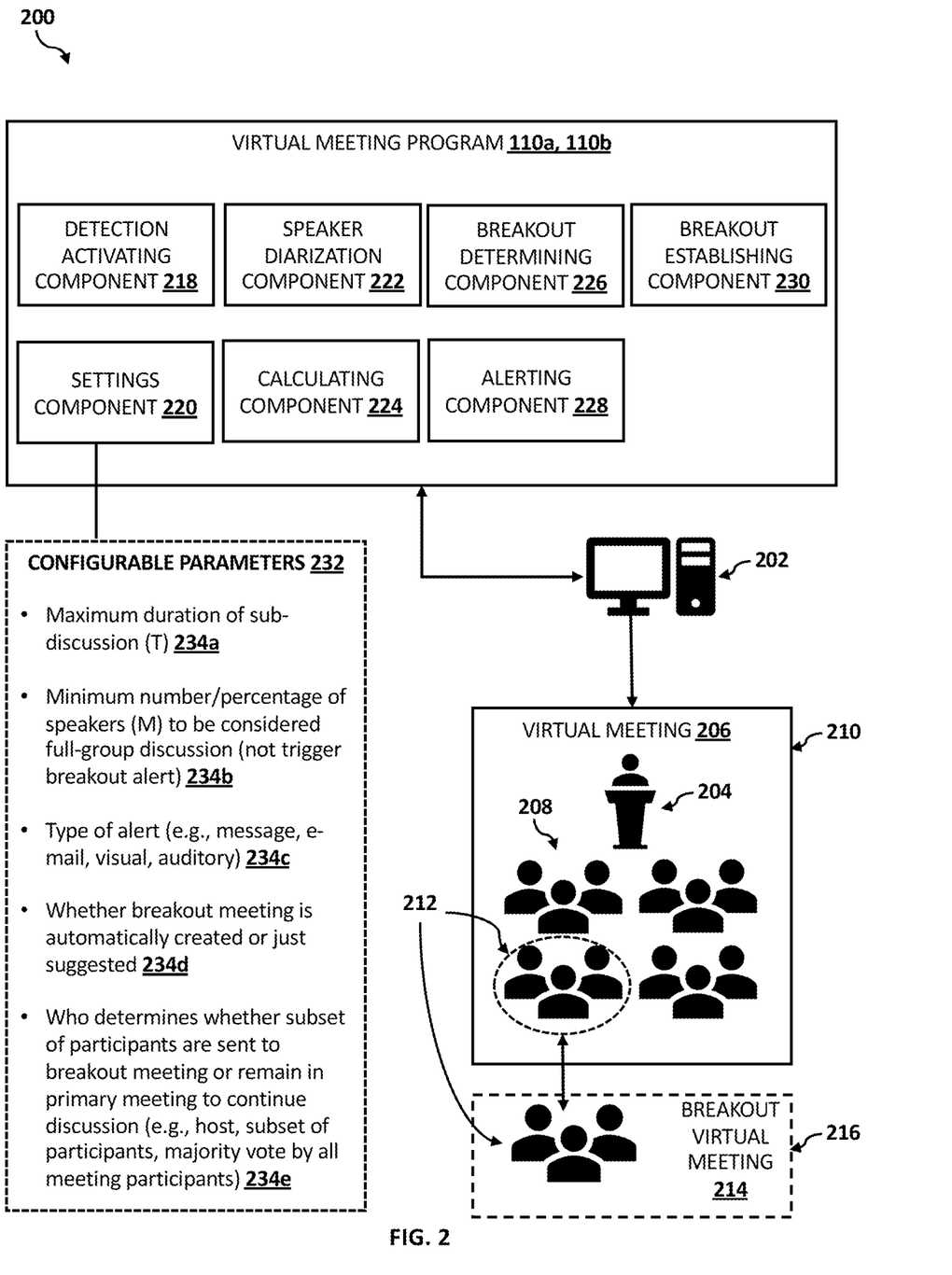
FIG. 2 is a schematic block diagram of a virtual meeting environment according to at least one embodiment.

Referring now to FIG. 2, a schematic block diagram of a virtual meeting environment 200 implementing the virtual meeting program 110a, 110b according to at least one embodiment is depicted. According to one embodiment, the virtual meeting environment 200 may include one or more components (e.g., client computer 102; server computer 112; communication network 116) of the computer environment 100 discussed above with reference to FIG. 1.

According to one embodiment, the virtual meeting environment 200 may include a computer system 202 having a tangible storage device and a processor that is enabled to run the virtual meeting program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smart telephone, a smart watch or other smart wearable, or other electronic devices.

According to one embodiment, a user 204 may interact with the virtual meeting program 110a, 110b running on computer system 202 to initiate a virtual meeting 206 including a set of participants 208. In one embodiment, each participant 208 may interact with a computing device (e.g., client computer 102) to join the virtual meeting 206. In one embodiment, user 204 may include one or more meeting hosts or meeting leaders associated with virtual meeting 206. In some embodiments, the user 204 may be part of the set of participants 208.

In one embodiment, the virtual meeting 206 may include any computerized version of a real-time conversation/discussion between the set of participants 208 (e.g., including user 204). As such, the virtual meeting 206 may include a video conference, a telephone conference, or a hybrid conference including the set of participants 208 using video calling and telephone calling. In one embodiment, the virtual meeting program 110a, 110b may support the real-time audio and video streaming between the set of participants 208 logged into a virtual meeting room 210.

It is contemplated that the topics discussed in the virtual meeting 206 should be relevant for all of the set of participants 208. However, in some instances, it may be valuable for a subset of participants 212 (e.g., less than the number of participants in the set of participants 208) to have a side conversation which may not involve all of the set of participants 208. As will be further detailed below, the virtual meeting program 110a, 110b may identify the side conversation among the subset of participants 212 and automatically detect the need to establish a potential breakout virtual meeting 214 to facilitate the conversation among only the relevant subset of participants 212. In one embodiment, the virtual meeting 206 may be referred to as a main or primary meeting and the breakout virtual meeting 214 may be referred to as a sidebar or secondary meeting. In one embodiment, the virtual meeting program 110a, 110b may establish a breakout virtual meeting room 216 to facilitate the breakout virtual meeting 214 with the subset of participants 212 in an environment that is audio and video insulated from the primary meeting (e.g., virtual meeting 206) in the virtual meeting room 210. In various embodiments, the virtual meeting room 210 streaming the primary meeting (e.g., virtual meeting 206) may be referred to as a main or primary meeting room and the breakout virtual meeting room 216 streaming the sidebar meeting (e.g., breakout virtual meeting 214) may be referred to as a sidebar or secondary meeting room.

According to at least one embodiment, the virtual meeting program 110a, 110b may include a single computer program or multiple program components/modules or sets of instructions being executed by the processor of the computer system 202. The virtual meeting program 110a, 110b may include routines, objects, components, units, logic, data structures, and actions that may perform particular tasks or implement particular abstract data types. The virtual meeting program 110a, 110b may be practiced in distributed cloud computing environments where tasks may be performed by remote processing devices which may be linked through the communication network 116. In one embodiment, the virtual meeting program 110a, 110b may include program instructions that may be collectively stored on one or more computer-readable storage media. As shown in the illustrated embodiment of FIG. 2, the virtual meeting program 110a, 110b may include a detection activating component 218, a settings component 220, a speaker diarization component 222, a calculating component 224, a breakout determining component 226, an alerting component 228, and a breakout establishing component 230.

According to one embodiment, the detection activating component 218 may enable the user 204 to toggle between activating automatic breakout detection and deactivating automatic breakout detection. For example, if virtual meeting 206 is a presentation where the intention is for only the presenter(s) to be speaking, the user may interact with the detection activating component 218 to deactivate the automatic breakout detection.

According to one embodiment, the settings component 220 of the virtual meeting program 110a, 110b may enable the user 204 to define one or more configurable parameters 232 (e.g., initial settings) associated with automatically detecting a need for a breakout meeting. In some embodiments, the virtual meeting program 110a, 110b may include one or more default values for the configurable parameters 232.

In one embodiment, the configurable parameters 232 may include a time duration parameter 234a. In at least one embodiment, the time duration parameter 234a may enable the user 204 to enter a time value indicating a maximum duration of a sub-discussion (T). The maximum duration of the sub-discussion may be associated with determining how much time has passed during which only a small number of participants (e.g., subset of participants 212) have spoken in the meeting. In one embodiment, if a duration of a sub-discussion extends beyond the maximum duration (T) indicated by the user 204, the virtual meeting program 110a, 110b may automatically determine the need for the breakout virtual meeting 214 if a minimum participation parameter 234b is not met, as will be further detailed below. In one embodiment, the maximum duration of the sub-discussion (T) may include a set period of time which may be entered by the user 204 in hours, minutes, and/or seconds.

In one embodiment, the configurable parameters 232 may include a minimum participation parameter 234b. In at least one embodiment, the minimum participant parameter 234b may enable the user 204 to enter a value for a minimum amount of participants (M) that need to be speaking over the set period of time indicated by the time duration parameter 234a (e.g., the maximum duration of the sub-discussion (T)) for the virtual meeting 206 to be considered a full-group discussion and not breakout-worthy. In one embodiment, the minimum participants value may be represented by a minimum number of participants (e.g., raw number) and/or a percentage of the total participants in the set of participants 208.

In one embodiment, the configurable parameters 232 may include an alert mechanism parameter 234c. In at least one embodiment, the alert mechanism parameter 234c may enable the user 204 to select a type of alert which the virtual meeting program 110a, 110b may implement to notify the virtual meeting 206 (e.g., including the meeting host/leader and set of participants 208/subset of participants 212) of the need to create the breakout virtual meeting 214. In one embodiment, the user 204 may select to receive a textual alert (e.g., e-mail or other messaging platform), a visual or graphical alert, and/or an auditory alert. In other embodiments, any suitable alerting mechanism (e.g., haptic) may also be provided as an option to the user 204.

In one embodiment, the configurable parameters 232 may include a breakout action parameter 234d. In at least one embodiment, the breakout action parameter 234d may enable the user 204 to select a value indicating whether the breakout virtual meeting 214 and/or the breakout virtual meeting room 216 is automatically created (e.g., if breakout conditions are met) or if the breakout virtual meeting 214 and/or the breakout virtual meeting room 216 is suggested (e.g., if breakout conditions are met). In various embodiments, when the virtual meeting program 110a, 110b detects that the breakout virtual meeting 214 may be necessary and sends an alert, the breakout virtual meeting 214 may be created immediately, or the relevant set of participants (e.g., subset of participants 212) may schedule a meeting in the future so they do not miss the content of the primary meeting (e.g., virtual meeting 206). The breakout action parameter 234d may provide the set of participants 208 and/or the subset of participants 212 the flexibility to decide which option makes sense for the current virtual meeting 206. In various embodiments, the virtual meeting program 110a, 110b may enable automatically creating the breakout virtual meeting 214, sending an alert/suggestion to create the breakout virtual meeting 214, or alerting one or more participants in the set of participants 208 that the sub-discussion should be a topic for a separate, future sub-meeting.

In one embodiment, the configurable parameters 232 may include a breakout decision parameter 234e. In at least one embodiment, the breakout decision parameter 234e may enable the user 204 to enter a value corresponding to who determines whether the subset of participants 212 are sent into the breakout virtual meeting 214 (e.g., in breakout virtual meeting room 216) or remain in the primary meeting (e.g., virtual meeting 206 in virtual meeting room 210) to continue the sub-discussion. Possible values for the breakout decision parameter 234e may include, for example, the relevant participants partaking in the sub-discussion (e.g., subset of participants 212), the host (e.g., user 204), or majority vote by all of the meeting participants (e.g., set of participants 208).

According to one embodiment, once the virtual meeting 206 is initialized, the virtual meeting program 110a, 110b may receive a computerized version of a real-time conversation between the set of participants 208 in the virtual meeting 206. In one embodiment, the virtual meeting program 110a, 110b may implement the speaker diarization component 222 to segment and cluster an input audio stream associated with the real-time conversation by unique speakers. In one embodiment, the speaker diarization component 222 may implement machine learning techniques to model each of the speakers (e.g., participants 208) and assign corresponding time frames for when they are speaking. Accordingly, the speaker diarization component 222 may automatically transcribe the audio stream of the virtual meeting 206 into a timestamped speaker log indicating who is speaking and when. In one embodiment, the timestamped speaker log may be dynamically generated in real-time as the virtual meeting 206 is progressing.

According to one embodiment, the calculating component 224 of the virtual meeting program 110a, 110b may receive the timestamped speaker log from the speaker diarization component 222 and calculate the number of unique speakers (S) that have spoken over a set period of time. In one embodiment, the calculating component 224 may calculate the number of unique speakers (S) over the set period of time indicated by the time duration parameter 234a (e.g., maximum duration of the sub-discussion time value (T)) entered by the user 204. For example, if the user 204 entered five minutes for the time duration parameter 234a, the calculating component 224 may analyze the timestamped speaker log and calculate the number of unique speakers (S) that have spoken over the past five minutes.

According to one embodiment, the breakout determining component 226 of the virtual meeting program 110a, 110b may receive the number of unique speakers (S) calculated by the calculating component 224 and may compare the number of unique speakers (S) against the minimum participation parameter 234b (e.g., minimum number/percentage of speakers (M)) value set by the user 204 in the configurable parameters 232. In one embodiment, if the number of unique speakers (S) is less than the minimum number/percentage of speakers (M) value set by the user 204, the breakout determining component 226 may identify those unique speakers (S) as the subset of participants 212 (e.g., potential breakout group) having a sub-discussion (e.g., sidebar/breakout discussion) extending beyond the maximum duration for sub-discussions (T) set by the user 204. In another embodiment, if the number of unique speakers (S) is more than or equal to the minimum number/percentage of speakers (M) value set by the user 204, the breakout determining component 226 may determine that a full-group discussion is taking place in the virtual meeting 206 (e.g., primary meeting) and the set of participants 208 may remain in the virtual meeting room 210.

According to one embodiment, the alerting component 228 may transmit an alert to one or more of the set of participants 208 in the event that the breakout determining component 226 detects a need for the breakout virtual meeting 214. In one embodiment, the alert mechanism (e.g., message, e-mail, visual, auditory) may be determined by the alert mechanism parameter 234c value selected by the user 204. In one embodiment, the alert (e.g., message, e-mail, visual, auditory) may be transmitted to the host and/or all participants. In at least one embodiment, the alert (e.g., message, e-mail, visual, auditory) may be transmitted to the relevant participants (e.g., subset of participants 212 identified as having a breakout-worthy discussion). In various embodiments, the alert may be generated within the primary meeting room (e.g., audio and/or visual message generated in the virtual meeting room 210 instructing the relevant participants to select button or other link to start the breakout virtual meeting 214).

According to at least one embodiment, the virtual meeting program 110a, 110b may be enabled to provide suggestions and/or information regarding the optimal use of time during the progression of the virtual meeting 206. In such embodiments, the virtual meeting program 110a, 110b may not force participants (e.g., subset of participants 212) into the breakout virtual meeting 214. Thus, the meeting participants/host (e.g., based on the breakout determination parameter 234e selected by the user 204) may decide for themselves as to how best to respond to an alert from the alerting component 228. As such, the meeting participants/host may determine whether it makes sense to: form the breakout virtual meeting 214 now, set up the breakout virtual meeting 214 at a future time, or continue the sub-discussion within the primary meeting (e.g., virtual meeting 206).

According to one embodiment, the virtual meeting program 110a, 110b may implement the breakout establishing component 230 to generate the breakout virtual meeting room 216 for the breakout virtual meeting 214. In at least one embodiment, when the virtual meeting program 110a, 110b detects that the breakout virtual meeting 214 may be necessary and transmits the alert, the breakout establishing component 230 may automatically generate the secondary meeting room (e.g., breakout virtual meeting room 216) for the breakout virtual meeting 214. In another embodiment, the breakout establishing component 230 may not generate the breakout virtual meeting 214 until prompted by one or more of the meeting participants/host (e.g., based on the breakout determination parameter 234e selected by the user 204) in response to receiving the alert from the alerting component 228.

In one embodiment, the breakout virtual meeting room 216 (e.g., secondary meeting room) may be audio/video insulated from the virtual meeting room 210 (e.g., primary meeting room). In one embodiment, the breakout establishing component 230 may enable the relevant participants (e.g., subset of participants 212) to dynamically move from the primary meeting room to the secondary meeting room and vice versa. In one embodiment, when the breakout virtual meeting 214 is completed, the breakout establishing component 230 may close the secondary meeting room and move the relevant participants back to the primary meeting room.

Figure 3:
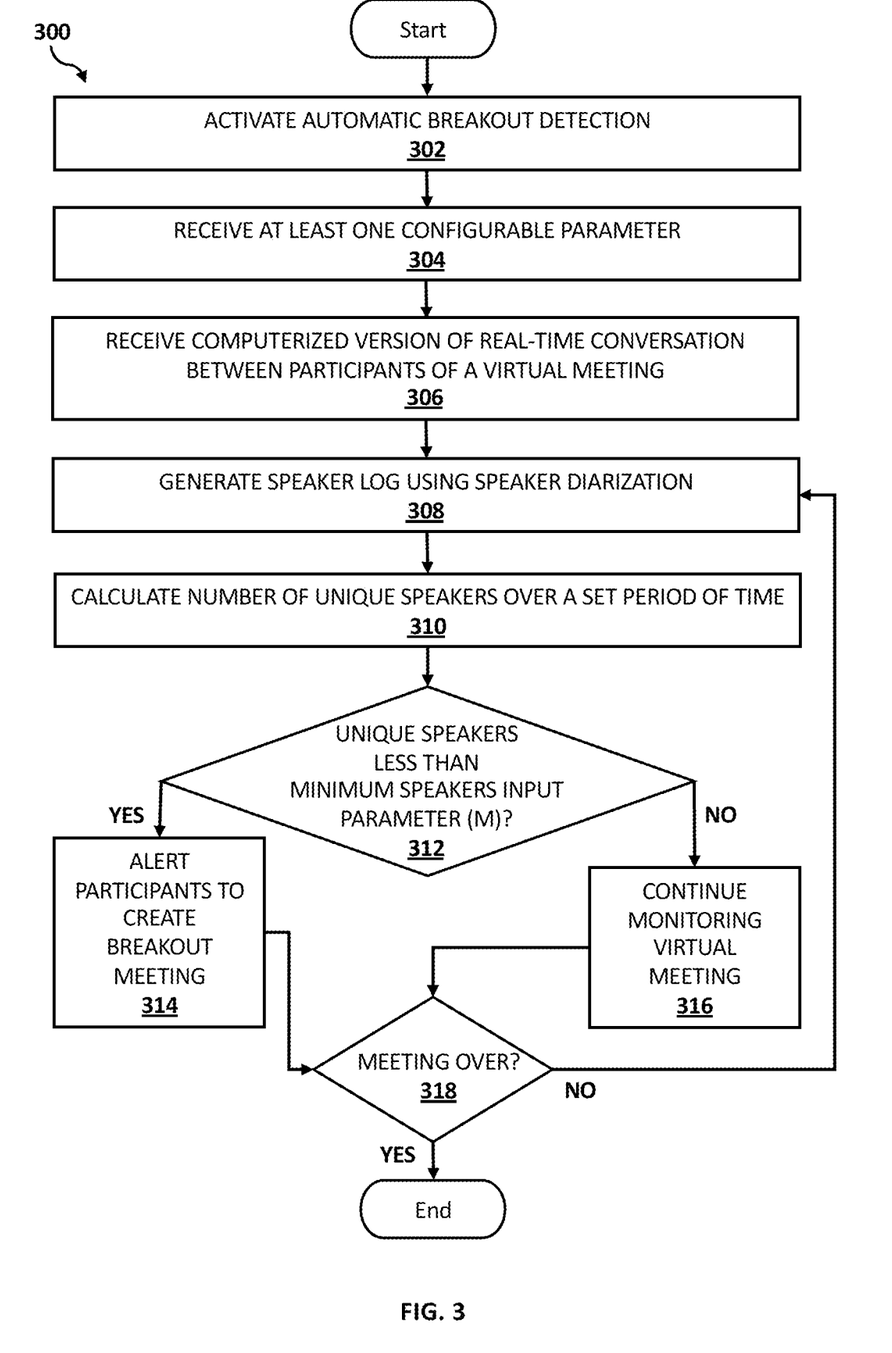
FIG. 3 is an operational flowchart illustrating a virtual meeting process for automatic breakout detection according to at least one embodiment.

Referring now to FIG. 3, an operational flowchart illustrating the exemplary virtual meeting process 300 used by the virtual meeting program 110a and 110b according to at least one embodiment is depicted.

At 302, automatic breakout detection is activated. According to one embodiment, a user may implement the virtual meeting program 110a, 110b to enable automatic breakout meeting detection in order to receive suggestions and/or information regarding the optimal use of time during the progression of a virtual meeting. In one embodiment, the virtual meeting program 110a, 110b may enable the automatic breakout detection using the detection activating component 218, as described previously with reference to FIG. 2.

Then at 304, at least one configurable parameter is received. According to one embodiment, the virtual meeting program 110a, 110b (e.g., using the settings component 220) may enable the user to define one or more configurable parameters (e.g., initial settings) associated with automatically detecting a need for a breakout meeting. In various embodiments, the virtual meeting program 110a, 110b may the user to input the following configurable parameters: a time duration parameter, a minimum participation parameter, an alert mechanism parameter, a breakout action parameter, and a breakout decision parameter.

According to one embodiment, the time duration parameter may enable the user to enter a time value indicating a maximum duration of a sub-discussion (T), as described previously with reference to FIG. 2. In one embodiment, the maximum duration of the sub-discussion (T) may include a set period of time which may be entered by the user 204 in hours, minutes, and/or seconds.

According to one embodiment, the minimum participation parameter may enable the user to enter a value for a minimum amount of participants (M) that need to be speaking over the set period of time indicated by the time duration parameter (e.g., the maximum duration of the sub-discussion (T)) for the virtual meeting to be considered a full-group discussion and not breakout-worthy, as described previously with reference to FIG. 2.

According to one embodiment, the alert mechanism parameter may enable the user to select a type of alert which the virtual meeting program 110a, 110b may implement to notify the virtual meeting (e.g., including the meeting host/leader and set of participants/subset of participants) of the need to create the breakout virtual meeting, as described previously with reference to FIG. 2.

According to one embodiment, the breakout action parameter may enable the user to select a value indicating whether the virtual meeting program 110a, 110b may automatically establish the breakout virtual meeting and/or the breakout virtual meeting room if breakout conditions are met or if the virtual meeting program 110a, 110b may only suggest that the breakout virtual meeting and/or the breakout virtual meeting room may be necessary if breakout conditions are met, as described previously with reference to FIG. 2.

According to one embodiment, the breakout decision parameter may enable the user to enter a value identifying the decision maker(s) who may determine whether the subset of participants having a sub-discussion may be sent into a breakout virtual meeting (e.g., in breakout virtual meeting room) or may remain in the primary meeting room to continue the sub-discussion during the primary virtual meeting, as described previously with reference to FIG. 2.

Then at 306, a computerized version of a real-time conversation between participants of a virtual meeting is received. According to one embodiment, once the virtual meeting is initialized, the virtual meeting program 110a, 110b may receive audio and/or video data from the computing devices of each of the set of participants associated with the virtual meeting. In one embodiment, the audio and/or video data received by the virtual meeting program 110a, 110b may represent the real-time conversation between the participants in the virtual meeting.

Then at 308, a speaker log is generated using speaker diarization. According to one embodiment, the virtual meeting program 110a, 110b (e.g., using speaker diarization component 222) may receive an input audio stream associated with the real-time conversation in the virtual meeting and may segment and cluster the input audio stream by unique speakers. According to one embodiment, the virtual meeting program 110a, 110b may automatically transcribe the audio stream of the virtual meeting into a timestamped speaker log indicating who is speaking and when they are speaking. In one embodiment, the virtual meeting program 110a, 110b may dynamically generate the timestamped speaker log in real-time as the virtual meeting is progressing, as described previously with reference to FIG. 2.

Then at 310, a number of unique speakers over a set period of time is calculated. According to one embodiment, the virtual meeting program 110a, 110b (e.g., using the calculating component 224) may receive the timestamped speaker log generated using from process 308. In one embodiment, the virtual meeting program 110a, 110b may analyze the timestamped speaker log and calculate the number of unique speakers (S) that have spoken over a set period of time. In one embodiment, the virtual meeting program 110a, 110b may calculate the number of unique speakers (S) over the set period of time indicated by the time duration parameter (e.g., maximum duration of the sub-discussion time value (T)) entered by the user, as described previously with reference to FIG. 2.

Then at 312, the virtual meeting program 110a, 110b determines if the number of unique speakers (S) is less than the minimum number/percentage of speakers input parameter (M)) value. According to one embodiment, the virtual meeting program 110a, 110b (e.g., using the breakout determining component 226) may receive the number of unique speakers (S) calculated at process 310. In one embodiment, the virtual meeting program 110a, 110b may compare the number of unique speakers (S) against the minimum participation parameter (e.g., minimum number/percentage of speakers (M)) value set by the user in the configurable parameters, as described previously with reference to FIG. 2.

If at 312, the virtual meeting program 110a, 110b determines that the number of unique speakers (S) is less than the minimum number/percentage of speakers (M)) value, then at 314 ("yes" branch), the virtual meeting program 110a, 110b alerts one or more participants to create a breakout virtual meeting. According to one embodiment, the virtual meeting program 110a, 110b (e.g., using alerting component 228) may transmit an alert to one or more of the set of participants in the event that the virtual meeting program 110a, 110b detects a need for the breakout virtual meeting. In one embodiment, the alert mechanism (e.g., message, e-mail, visual, auditory) may be determined by the alert parameter value selected by the user. In one embodiment, the alert (e.g., message, e-mail, visual, auditory) may be transmitted to the host and/or all participants. In at least one embodiment, the alert (e.g., message, e-mail, visual, auditory) may be transmitted to the relevant participants (e.g., subset of participants identified as having a breakout-worthy discussion). In various embodiments, the alert may be generated within the primary meeting room (e.g., audio and/or visual message generated in the virtual meeting room instructing the relevant participants to select button or other link to start the breakout virtual meeting). In one embodiment, the virtual meeting program 110a, 110b may enable the meeting participants/host (e.g., based on the breakout determination parameter selected by the user) to decide how best to respond to an alert from the virtual meeting program 110a, 110b. As such, the meeting participants/host may determine whether it makes sense to: form the breakout virtual meeting now, set up the breakout virtual meeting at a future time, or continue the sub-discussion within the primary virtual meeting.

According to another embodiment, when the virtual meeting program 110a, 110b detects that the breakout virtual meeting may be necessary and transmits the alert, the virtual meeting program 110a, 110b (e.g., using breakout establishing component 230) may automatically generate a secondary meeting room (e.g., breakout virtual meeting room) for the breakout virtual meeting. In some embodiments, the virtual meeting program 110a, 110b may automatically redirect the relevant participants (e.g., subset of participants identified as having a breakout-worthy discussion) to the breakout virtual meeting in the breakout virtual meeting room.

The following is a scenario describing the "yes" branch of the determination process 312 (e.g., detecting a need for a breakout virtual meeting). For example, there may be a weekly meeting to discuss Project X, which is attended by 20 participants (e.g., the set of participants 208). The meeting leader (e.g., user 204) may initiate the virtual meeting program 110a, 110b and activate the automatic breakout detection. In one embodiment, the meeting leader may define the following two initial parameters (e.g., from configurable parameters 232): M=minimum 4 people or 20% of the meeting participants must speak (e.g., minimum participation parameter 234b) and T=maximum 5 minutes for a sub-discussion (e.g., time duration parameter (234a).

Continuing with the above example, in this week's meeting, Rachel and James became engaged in a detailed discussion about data storage and spent 20 minutes going back and forth as the only speakers during this large group meeting. The other members of the team need to know the outcome of this discussion but are not involved in deciding the data storage strategy for Project X. Based on processes 306, 308, and 310, the virtual meeting program 110a, 110b may determine that only 2 unique speakers (S) have spoken over the past 20 minutes. Thus, using process 312, the virtual meeting program 110a, 110b may detect that less than M participants (2<4) have spoken for more than T minutes (20>5) and may automatically send an alert to Rachel and James (e.g., subset of participants 212) suggesting a breakout virtual meeting in a secondary meeting room. In one embodiment, the virtual meeting program 110a, 110b may transmit a message to Rachel and James including a link to be redirected to the breakout virtual meeting established by the virtual meeting program 110a, 110b (e.g., process 314). In this example, Rachel and James may decide to move to the secondary meeting room (e.g., breakout virtual meeting room) to continue the data storage discussion. Once the data storage discussion is finished, Rachel and James may close the secondary meeting room and the virtual meeting program 110a, 110b may automatically redirect Rachel and James to the primary meeting room to participate in the discussion of Project X (e.g., primary meeting).

However, if at 312, the virtual meeting program 110a, 110b determines that the number of unique speakers (S) is more than or equal to the minimum number/percentage of speakers (M) value set by the user 204, then at 316 ("no" branch), the virtual meeting program 110a, 110b continues to monitor the virtual meeting. According to one embodiment, at 316, the virtual meeting program 110a, 110b may determine that a full-group discussion is taking place in the virtual meeting and thus may not transmit an alert to create the breakout virtual meeting.

The following is a scenario describing the "no" branch of the determination process 312 (e.g., not detecting a need for a breakout virtual meeting). For example, there may be a weekly meeting to discuss Project Y, which is attended by 20 participants (e.g., the set of participants 208). The meeting leader (e.g., user 204) may initiate the virtual meeting program 110a, 110b and activate the automatic breakout detection. In one embodiment, the meeting leader may define the following two initial parameters (e.g., from configurable parameters 232): M=minimum 4 people or 20% of the meeting participants must speak (e.g., minimum participation parameter 234b) and T=maximum 5 minutes for a sub-discussion (e.g., time duration parameter (234a).

Continuing with the above example, in this week's meeting, Rachel and James became engaged in a detailed discussion about data storage and spent 20 minutes going back and forth as the primary speakers during this large group meeting. However, Jeff, Nigel, and Sara additionally chime in every few minutes to add information to the discussion. Although the entire team does not have information to contribute, the discussion is highly relevant to them as they need to access the data and thus are stakeholders in the data storage decision process. Based on processes 306, 308, and 310, the virtual meeting program 110a, 110b may determine that 5 unique speakers (S) have spoken over the past 20 minutes. Thus, using process 312, the virtual meeting program 110a, 110b may detect that more than M participants (5<4) have spoken for more than T minutes (20>5). Accordingly, the virtual meeting program 110a, 110b may determine the current discussion to be a full-group discussion and thus does not send an alert to create a breakout virtual meeting.

Thereafter at 318, the virtual meeting program 110a, 110b determines if the virtual meeting is over. In one embodiment, the virtual meeting program 110a, 110b may determine that the virtual meeting is over if the virtual meeting program 110a, 110b receives a prompt from the host to end the meeting and/or if the virtual meeting program 110a, 110b detects a majority of the participants leaving the virtual meeting. If at 318, the virtual meeting program 110a, 110b determines that the virtual meeting is over (e.g., "yes" branch), then the virtual meeting program 110a, 110b may end the virtual meeting process 300. However, if at 318, the virtual meeting program 110a, 110b determines that the virtual meeting is not over (e.g., "no" branch), then the virtual meeting process 300 may return to process 308 to generate the speaker log using speaker diarization, as described previously.

Accordingly, the virtual meeting program 110a, 110b may improve the functionality of a computer because the virtual meeting program 110a, 110b may enable the computer to receive a computerized version of a real-time conversation among a set of participants of a virtual meeting and automatically determine whether a breakout virtual conversation is necessary among a breakout group including less than a majority of the plurality of participants of the real-time conversation.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
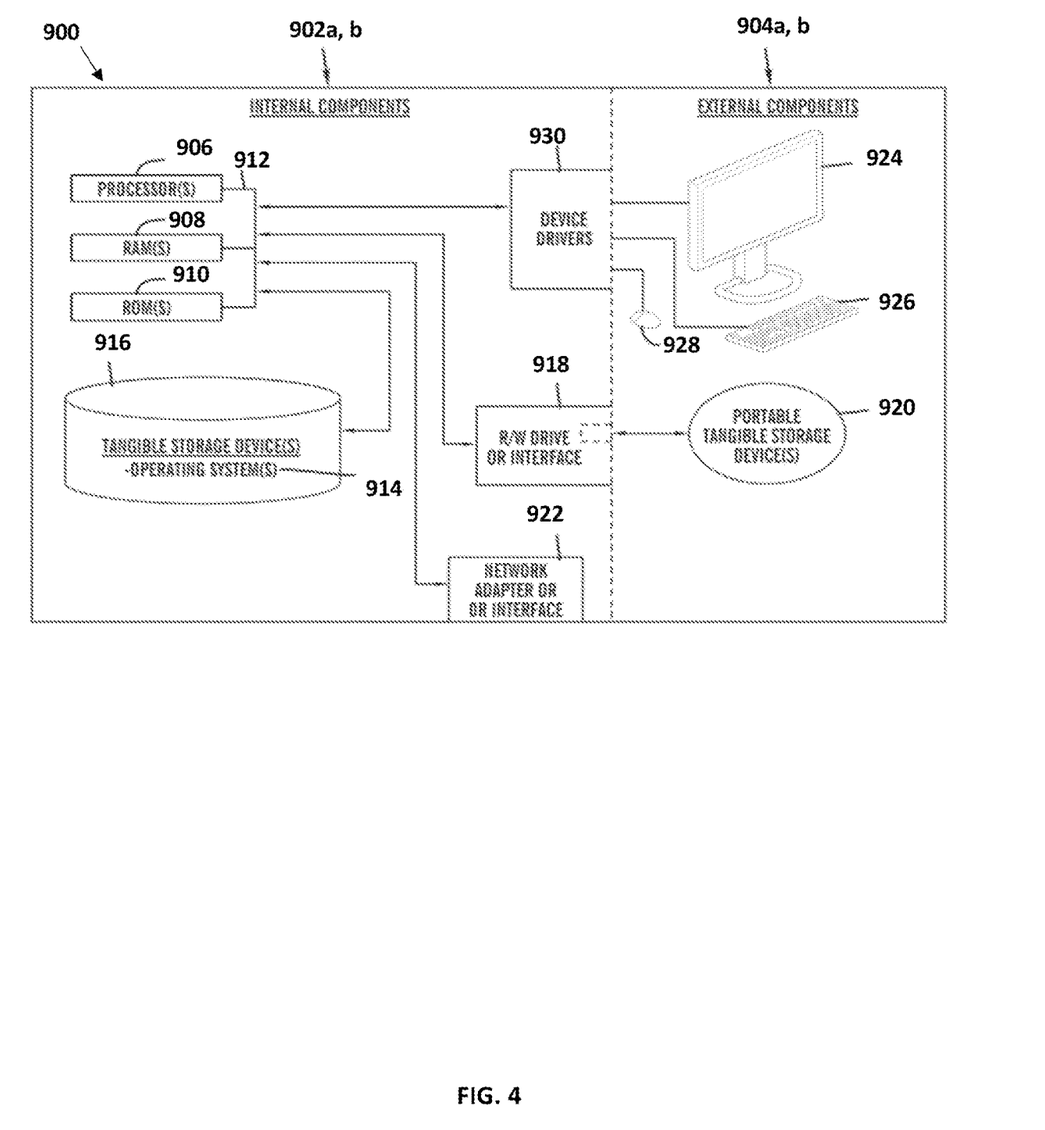
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the virtual meeting program 110a in client computer 102, and the virtual meeting program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the virtual meeting program 110a and 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the virtual meeting program 110*a* in client computer 102 and the virtual meeting program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the virtual meeting program 110*a* in client computer 102 and the virtual meeting program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
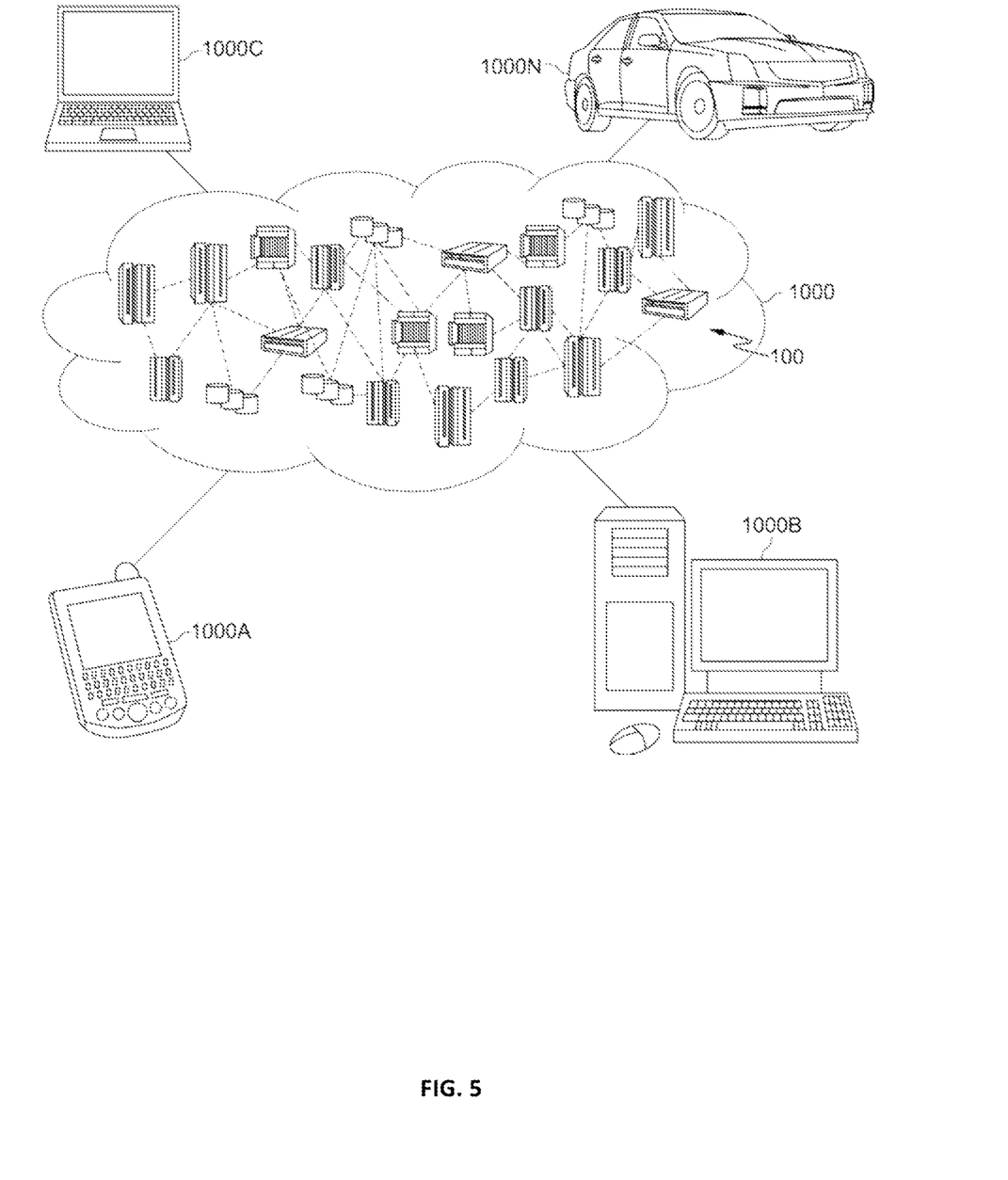
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
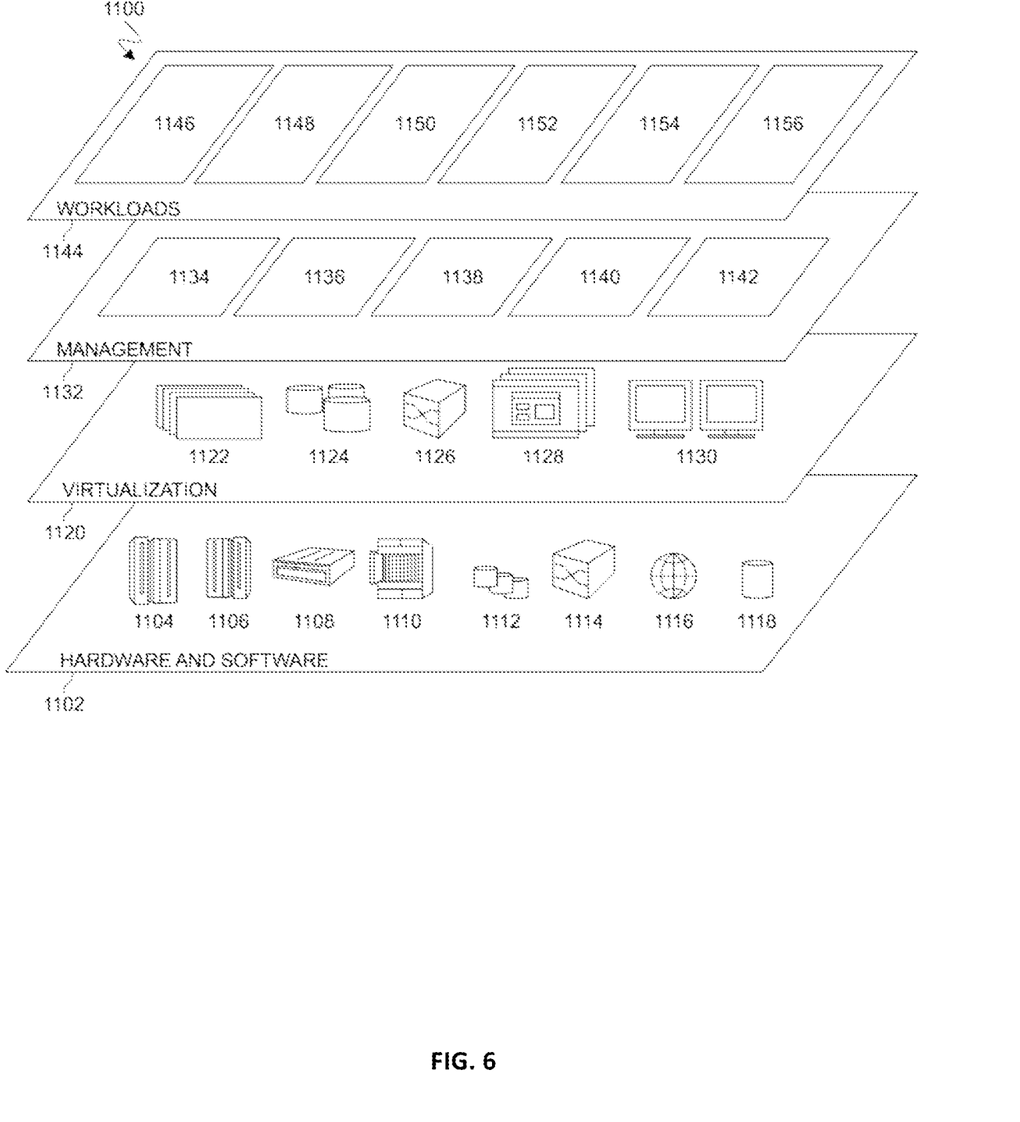
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and automatic breakout virtual meeting detection 1156. A virtual meeting program 110a, 110b provides a way to automatically detect a need to create a breakout virtual meeting within a primary virtual meeting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a computerized version of a real-time conversation between a plurality of participants of a virtual meeting;
   automatically detecting whether the virtual meeting includes a sub-discussion based on an audio stream of the virtual meeting, wherein the automatic detection includes:
      generating a timestamped speaker log based on the received computerized version of the real-time conversation between the plurality of participants of the virtual meeting;
      calculating, based on the generated timestamped speaking log, a number of unique speakers talking over a set period of time; and
      comparing the calculated number of unique speakers against a minimum participation parameter to determine whether the virtual meeting includes the sub-discussion;
   in response to automatically detecting that the virtual meeting includes the sub-discussion, automatically determining whether a breakout virtual meeting is necessary among a subset of the plurality of participants of the virtual meeting that are participating in the automatically detected sub-discussion; and
   in response to automatically determining that the breakout virtual meeting is necessary, automatically transmitting an alert indicating that the breakout virtual meeting is necessary among the subset of the plurality of participants of the virtual meeting.

2. The method of claim 1, further comprising:
   receiving a time duration parameter, wherein the received time duration parameter is associated with a maximum duration of the detected sub-discussion in the virtual meeting;
   receiving a minimum participation parameter, wherein the received minimum participation parameter is associated with a minimum number of the plurality of participants that need to speak for the virtual meeting to be considered a full-group discussion;
   determining the detected sub-discussion in the virtual meeting extending beyond a set period of time determined by the received time duration parameter;
   determining that the subset of the plurality of participants speaking during the detected sub-discussion is less than the received minimum participation parameter; and
   automatically transmitting the alert to the subset of the plurality of participants including a link to the breakout virtual meeting, wherein the breakout virtual meeting is established in a breakout virtual meeting room that is audio and video insulated from the virtual meeting.

3. The method of claim 1, further comprising:
receiving a breakout action parameter indicating the breakout virtual meeting is automatically created responsive to a breakout condition being met; and
in response to automatically determining that the breakout virtual meeting is necessary, automatically creating the breakout virtual meeting for the subset of the plurality of participants of the virtual meeting.

4. The method of claim 1, further comprising:
receiving a breakout action parameter indicating the breakout virtual meeting is automatically suggested responsive to a breakout condition being met; and
in response to automatically determining that the breakout virtual meeting is necessary, automatically suggesting the breakout virtual meeting for the subset of the plurality of participants of the virtual meeting.

5. The method of claim 1, further comprising:
receiving a breakout decision parameter, wherein the received breakout decision parameter is associated with identifying at least one decision maker responsible for determining whether the subset of the plurality of participants is sent to the breakout virtual meeting, wherein the received breakout decision parameter is selected from the group consisting of: a host of the virtual meeting, the subset of the plurality of participants, and a majority vote by the plurality of participants.

6. The method of claim 1, further comprising:
receiving at least one configurable parameter, wherein the received at least one configurable parameter is selected from the group consisting of: a time duration parameter, a minimum participation parameter, an alert mechanism parameter, a breakout action parameter, and a breakout decision parameter.

7. A computer system for automatic detection of a need for a breakout virtual meeting, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving a computerized version of a real-time conversation between a plurality of participants of a virtual meeting;
automatically detecting whether the virtual meeting includes a sub-discussion based on an audio stream of the virtual meeting, wherein the automatic detection includes:
generating a timestamped speaker log based on the received computerized version of the real-time conversation between the plurality of participants of the virtual meeting;
calculating, based on the generated timestamped speaking log, a number of unique speakers talking over a set period of time; and
comparing the calculated number of unique speakers against a minimum participation parameter to determine whether the virtual meeting includes the sub-discussion;
in response to automatically detecting that the virtual meeting includes the sub-discussion, automatically determining whether a breakout virtual meeting is necessary among a subset of the plurality of participants of the virtual meeting that are participating in the automatically detected sub-discussion; and
in response to automatically determining that the breakout virtual meeting is necessary, automatically transmitting an alert indicating that the breakout virtual meeting is necessary among the subset of the plurality of participants of the virtual meeting.

8. The computer system of claim 7, further comprising:
receiving a time duration parameter, wherein the received time duration parameter is associated with a maximum duration of the detected sub-discussion in the virtual meeting;
receiving a minimum participation parameter, wherein the received minimum participation parameter is associated with a minimum number of the plurality of participants that need to speak for the virtual meeting to be considered a full-group discussion;
determining the detected sub-discussion in the virtual meeting extending beyond a set period of time determined by the received time duration parameter;
determining that the subset of the plurality of participants speaking during the detected sub-discussion is less than the received minimum participation parameter; and
automatically transmitting the alert to the subset of the plurality of participants including a link to the breakout virtual meeting, wherein the breakout virtual meeting is established in a breakout virtual meeting room that is audio and video insulated from the virtual meeting.

9. The computer system of claim 7, further comprising:
receiving a breakout action parameter indicating the breakout virtual meeting is automatically created responsive to a breakout condition being met; and
in response to automatically determining that the breakout virtual meeting is necessary, automatically creating the breakout virtual meeting for the subset of the plurality of participants of the virtual meeting.

10. The computer system of claim 7, further comprising:
receiving a breakout action parameter indicating the breakout virtual meeting is automatically suggested responsive to a breakout condition being met; and
in response to automatically determining that the breakout virtual meeting is necessary, automatically suggesting the breakout virtual meeting for the subset of the plurality of participants of the virtual meeting.

11. The computer system of claim 7, further comprising:
receiving a breakout decision parameter, wherein the received breakout decision parameter is associated with identifying at least one decision maker responsible for determining whether the subset of the plurality of participants is sent to the breakout virtual meeting, wherein the received breakout decision parameter is selected from the group consisting of: a host of the virtual meeting, the subset of the plurality of participants, and a majority vote by the plurality of participants.

12. The computer system of claim 7, further comprising:
receiving at least one configurable parameter, wherein the received at least one configurable parameter is selected from the group consisting of: a time duration parameter, a minimum participation parameter, an alert mechanism parameter, a breakout action parameter, and a breakout decision parameter.

13. A computer program product for automatic detection of a need for a breakout virtual meeting, comprising:
one or more computer-readable storage media and program instructions collectively stored on the one or more computer-readable storage media, the program instructions executable by a processor to cause the processor to perform a method comprising:

receiving a computerized version of a real-time conversation between a plurality of participants of a virtual meeting;

automatically detecting whether the virtual meeting includes a sub-discussion based on an audio stream of the virtual meeting, wherein the automatic detection includes:

generating a timestamped speaker log based on the received computerized version of the real-time conversation between the plurality of participants of the virtual meeting;

calculating, based on the generated timestamped speaking log, a number of unique speakers talking over a set period of time; and comparing the calculated number of unique speakers against a minimum participation parameter to determine whether the virtual meeting includes the sub-discussion;

in response to automatically detecting that the virtual meeting includes the sub-discussion, automatically determining whether a breakout virtual meeting is necessary among a subset of the plurality of participants of the virtual meeting that are participating in the automatically detected sub-discussion; and in response to automatically determining that the breakout virtual meeting is necessary, automatically transmitting an alert indicating that the breakout virtual meeting is necessary among the subset of the plurality of participants of the virtual meeting.

14. The computer program product of claim 13, further comprising:

receiving a time duration parameter, wherein the received time duration parameter is associated with a maximum duration of the detected sub-discussion in the virtual meeting;

receiving a minimum participation parameter, wherein the received minimum participation parameter is associated with a minimum number of the plurality of participants that need to speak for the virtual meeting to be considered a full-group discussion;

determining the detected sub-discussion in the virtual meeting extending beyond a set period of time determined by the received time duration parameter;

determining that the subset of the plurality of participants speaking during the detected sub-discussion is less than the received minimum participation parameter; and automatically transmitting the alert to the subset of the plurality of participants including a link to the breakout virtual meeting, wherein the breakout virtual meeting is established in a breakout virtual meeting room that is audio and video insulated from the virtual meeting.

15. The computer program product of claim 13, further comprising:

receiving a breakout action parameter indicating the breakout virtual meeting is automatically created responsive to a breakout condition being met; and in response to automatically determining that the breakout virtual meeting is necessary, automatically creating the breakout virtual meeting for the subset of the plurality of participants of the virtual meeting.

16. The computer program product of claim 13, further comprising:

receiving a breakout action parameter indicating the breakout virtual meeting is automatically suggested responsive to a breakout condition being met; and in response to automatically determining that the breakout virtual meeting is necessary, automatically suggesting the breakout virtual meeting for the subset of the plurality of participants of the virtual meeting.

17. The computer program product of claim 13, further comprising:

receiving a breakout decision parameter, wherein the received breakout decision parameter is associated with identifying at least one decision maker responsible for determining whether the subset of the plurality of participants is sent to the breakout virtual meeting, wherein the received breakout decision parameter is selected from the group consisting of: a host of the virtual meeting, the subset of the plurality of participants, and a majority vote by the plurality of participants.

* * * * *